United States Patent [19]

Kido

[11] Patent Number: 5,079,688
[45] Date of Patent: Jan. 7, 1992

[54] TRANSFORMERLESS POWER MONITOR CIRCUIT HAVING MEANS FOR ELECTRONICALLY LATCHING DC ALARMS

[75] Inventor: Toru Kido, Ibaragi, Japan

[73] Assignee: NEC Corporation, Tokyo, Japan

[21] Appl. No.: 627,141

[22] Filed: Dec. 13, 1990

[30] Foreign Application Priority Data

Dec. 13, 1989 [JP] Japan .................................. 1-323163

[51] Int. Cl.$^5$ ...................... G06F 9/00; G08B 21/00; H02M 7/00
[52] U.S. Cl. ................................... 363/125; 364/483; 340/650; 340/661
[58] Field of Search ................. 363/52, 125; 323/299; 361/90, 91, 111; 364/480, 481, 483, 492; 340/635, 641, 645, 650, 660-664

[56] References Cited

U.S. PATENT DOCUMENTS

4,991,105 2/1991 Pimental ............................. 364/483
5,019,996 5/1991 Lee ..................................... 364/483

Primary Examiner—Steven L. Stephan
Assistant Examiner—Emanuel T. Voeltz
Attorney, Agent, or Firm—Sughrue, Mion, Zinn, Macpeak & Seas

[57] ABSTRACT

In a power monitor circuit, AC power-line voltage is converted by a DC power supply to a regulated DC voltage. The DC power supply shuts down itself in the event of a failure therein. The output of DC supply rises from zero to a specified value in slow response to power-on state and drops to zero in slow response to a significant drop in the AC voltage. A rectifier-filter converts the AC voltage to a nonregulated DC voltage. The output of the rectifier-filter rises in quick response to the power-on state and drops in quick response to the significant AC voltage drop. If the output of DC power supply drops below a specified theshold due to AC power-line failure or due to its own failure, a DC low-voltage signal is generated. If the output of rectifier-filter rises above a specified low level a first AC transitory signal is generated and if it drops below a specified high level a second AC transitory signal is generated. A latch circuit is energized with the nonregulated DC voltage to latch the DC low-voltage signal if it occurs during the interval between the first and second AC transitory signals and supplies a DC alarm signal to computer circuitry. A power controller is energized with the regulated DC voltage to supply control signals to the computer circuitry in response to the first and second AC transitory signals.

5 Claims, 6 Drawing Sheets

TRANSFORMERLESS POWER MONITOR CIRCUIT HAVING MEANS FOR ELECTRONICALLY LATCHING DC ALARMS

BACKGROUND OF THE INVENTION

The present invention relates generally to power supplies, and more specifically to a power monitor circuit for a computer power supply.

Figure 1:
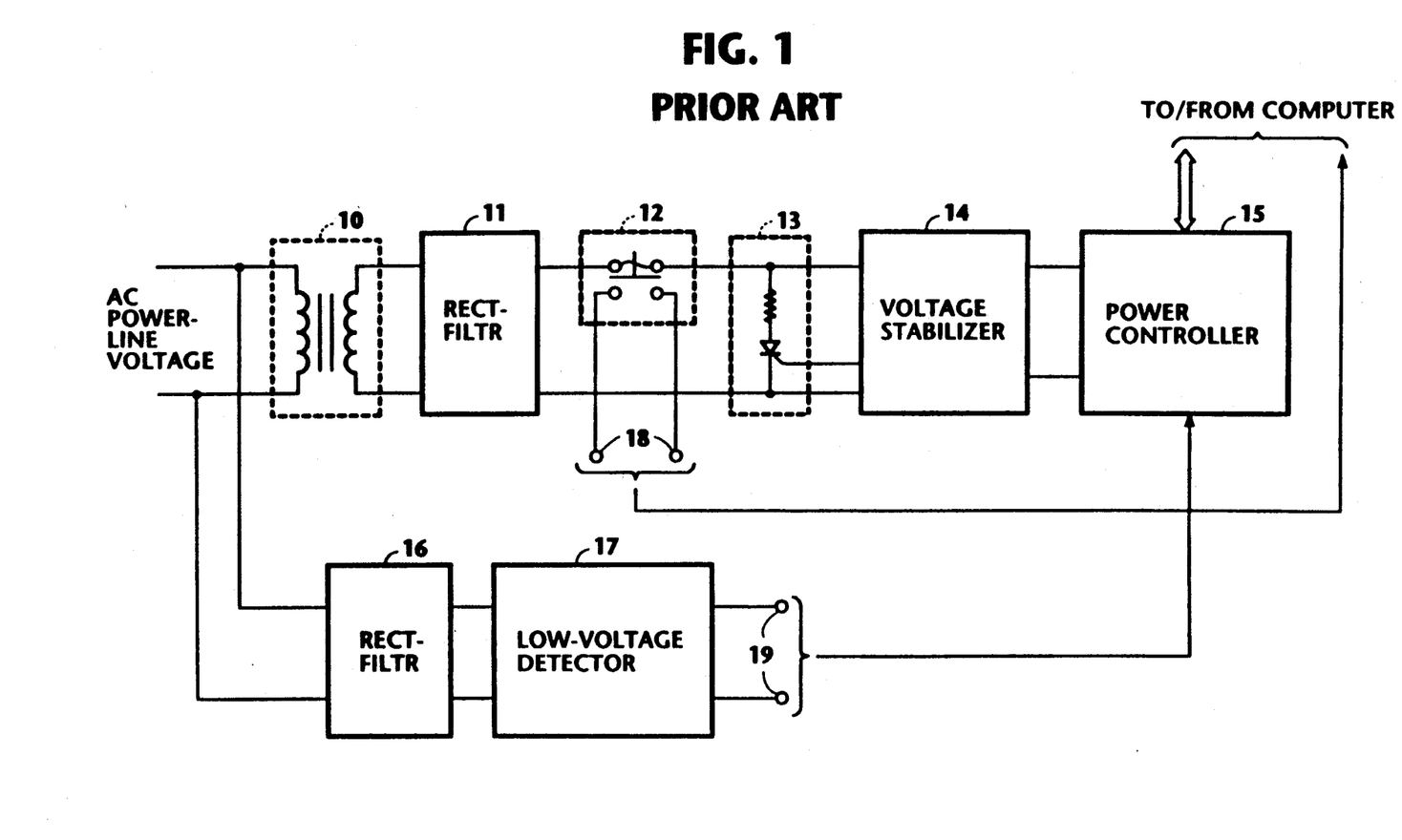
FIG. 1 is a block diagram of a prior art power monitor circuit.

With a prior art power monitor circuit as shown in FIG. 1, AC power-line voltage is supplied through an isolating transformer 10 to a rectifier-filter 11 in which it is converted to a DC voltage. One of the output terminals of the converter is coupled by way of a circuit breaker 12 to one input terminal of a voltage stabilizer 14 and the other outer terminal of the converter is coupled direct to the other input of the stabilizer. A short circuit 13 including a thyristor is connected across the input terminals of the stabilizer to provide a short-circuit path in response to a triggering signal supplied from the stabilizer if it encounters an overvoltage or overcurrent condition. When this occurs, circuit breaker 12 is triggered to mechanically latch this abnormal condition, giving a warning signal across DC alarm terminals 18. The output terminals of the stabilizer are coupled to a power controller 15 which supplies various control signals to a computer. The AC power-line voltage is also applied to a rectifier-filter 16 whose outputs are coupled to a low-voltage detector 17 to generate a warning signal across AC alarm terminals 19 if a voltage drop occurs in the AC power input.

However, prior art voltage stabilizer 14 has no ability to detect low DC voltages caused by failures other than overvoltages and overcurrents due to the fact that, if short circuit 13 is to be triggered in response to the detection of a DC low voltage condition, transitory events such as power-on states, AC-voltage drops and power outages are also undesirably detected as a power-line failure. The low voltage detection may be possible with the use of a separate inhibit circuit for disabling AC alarms which are generated at the instant the power monitor circuit is initially energized or at the instant a short-duration AC voltage drop occurs, but at some cost of complexity and additional hardware. In addition, the DC alarm signal must be maintained by mechanically latched contacts even though power controller 15 has become inactive following the occurrence of an overvoltage or overcurrent. Since the AC power line must be isolated from the short circuit that triggers the mechanical latch by the use of transformer 10, this adds to the overall cost and size of the power monitor circuit.

SUMMARY OF THE INVENTION

It is therefore an object of the present invention to provide a transformerless power monitor circuit in which DC alarm signals are electronically latched by deriving an energy source from the AC power line and in which low DC voltage is detected without using a separate inhibit circuit.

According to a first aspect of the present invention, there is provided a power monitor circuit comprising a DC power supply for converting an AC power-line voltage to a first DC voltage and shutting it down if an overvoltage or overcurrent occurs therein, and a rectifier-filter for converting the AC power-line voltage to a second DC voltage. A DC low-voltage detector is provided for monitoring the level of voltage at the output of the DC power supply and generating a DC low-voltage signal in response to a drop in the monitored voltage level below a specified value. An AC low-voltage detector is provided for monitoring the level of voltage at the output of the rectifier-filter and generating an AC normal-state signal if the monitored voltage level is higher than a prescribed value and an AC alarm signal if the monitored voltage level is below a prescribed value. A latch circuit is energized with the second DC voltage for latching the DC low-voltage signal during the presence of the AC normal-state signal.

According to a second aspect of this invention, there is provided a power monitor circuit which comprises DC power supply for converting an AC power-line voltage to a first DC voltage, the DC power supply having operating characteristics so that the level of voltage at the output thereof rises from zero to a regulated value in slow response to application of the power-line voltage thereto and drops to zero in slow response to a significant drop in the AC power-line voltage. The DC power supply shuts itself down in the event of a failure such as overvoltage and overcurrent conditions. A rectifier-filter converts the AC power-line voltage to a second DC voltage, the rectifier-filter having operating characteristics so that the level of voltage at the output thereof rises from zero to an operating value in quick response to application of the power-line voltage thereto and drops to zero in quick response to the significant drop in the AC power-line voltage. A DC low-voltage detector monitors the level of voltage at the output of the DC power supply and generates a DC low-voltage indicating signal in response to a drop in the monitored voltage level below a specified value. An AC low-voltage detector monitors the level of voltage at the output of the rectifier-filter and generates a first AC transitory signal in response to a rise in the monitored voltage level to the operating value and a second AC transitory signal in response to a drop in the monitored voltage level to a value at or near zero voltage. A latch circuit is energized with the second DC voltage for latching the DC low-voltage indicating signal during an interval which begins with the occurrence of the first AC transitory signal and terminates with the occurrence of the second AC transitory signal and deriving a DC alarm signal from the latched signal. A power control circuit is energized with the first DC voltage for controlling a utilization circuit in response to the first and second AC transitory signals.

Since the DC alarm signal is only generated in response to a drop in the output voltage of the DC power supply, there is no need to inhibit a DC alarm which would otherwise be generated at the instant the power monitor circuit is initially energized. Since DC alarm occurs only during the interval from the occurrence of the first AC transitory signal to the occurrence of the second AC transitory signal, undesirable DC alarms are not generated.

BRIEF DESCRIPTION OF THE DRAWINGS

The present invention will be described in further detail with reference to the accompanying drawings, in which.

DETAILED DESCRIPTION

Figure 2:
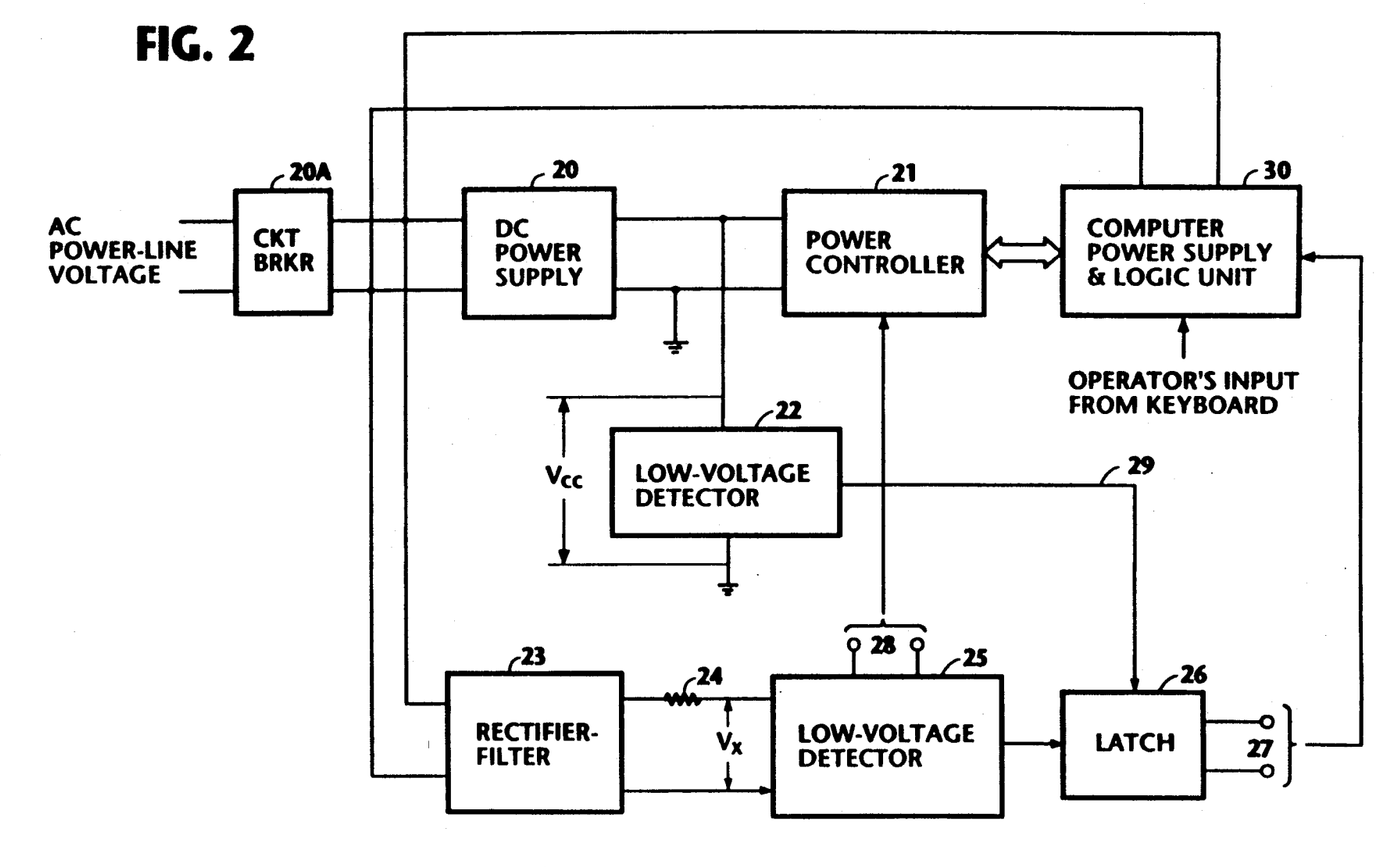
FIG. 2 is a block diagram of a power monitor circuit of the present invention.

Referring now to FIG. 2, there is shown a power monitor circuit for a computer according to an embodiment of the present invention. The AC-power line voltage is applied through a circuit breaker 20A to a DC power supply 20 where it is converted to a regulated DC voltage Vcc. DC power supply 20 includes an AC-DC converter and a voltage stabilizer, the operating characteristics of DC power supply 20 being such that its output voltage rises from zero to a specified value in slow response to the power-on operation of circuit breaker 20A and drops to zero in slow response to a significant drop in the AC power-line voltage. The output terminals of DC power supply 20 are coupled to a power controller 21 to energize it with the regulated DC voltage and further to a low-voltage detector 22. Detector 22 monitors the level of voltage at the output terminals of DC supply 20 to detect when it drops below a prescribed value and applies a DC-low indicating signal through an optical path 29 to a latch 26. DC power supply 20 is also provided with overvoltage and overcurrent detection circuits. When such conditions occur, DC power supply 20 shuts down itself, allowing its output voltage to drop to zero.

The AC power-line voltage is also applied to a rectifier-filter 23 in which it is converted to a second, nonregulated DC voltage and applied through a dropping resistor 24 to a low-voltage detector 25. The operating characteristics of rectifier-filter 23 are such that its output voltage rises from zero to an operating level in quick response to the power-on operation of the breaker 20A and drops to zero in quick response to the significant drop in the AC power-line voltage in comparison with the operating characteristics of DC power supply 20. Because of the quick response to significant variations in AC power-line voltage, the output of rectifier-filter 23 is used by detector 25 as a representative of the AC power-line voltage. Detector 25 generates first and second AC transitory signals in response to a rise and a drop, respectively, in the DC output voltage of rectifier-filter 23 and applies them through alarm terminals 28 to power controller 21 as an AC alarm signal.

In response to the AC transitory signals, power controller 21 supplies control signals to a computer power supply and logic unit 30 which is energized by the AC power-line voltage independently of power controller 21. An operator's command signal is applied from the keyboard to the circuit 30 to cause it to receive energy from the AC power-line. The DC alarm signal is also applied to the computer circuit 30 which combines it with signals supplied from power controller 21 to provide necessary control functions such as alarm-off and special interrupt.

During the interval between the first and second AC transitory signals generated by detector 25, the DC low indicating signal from detector 22 is latched by latch 26 and a DC alarm signal is derived from the latched signal and supplied to computer power supply and logic unit 30.

Figure 3:
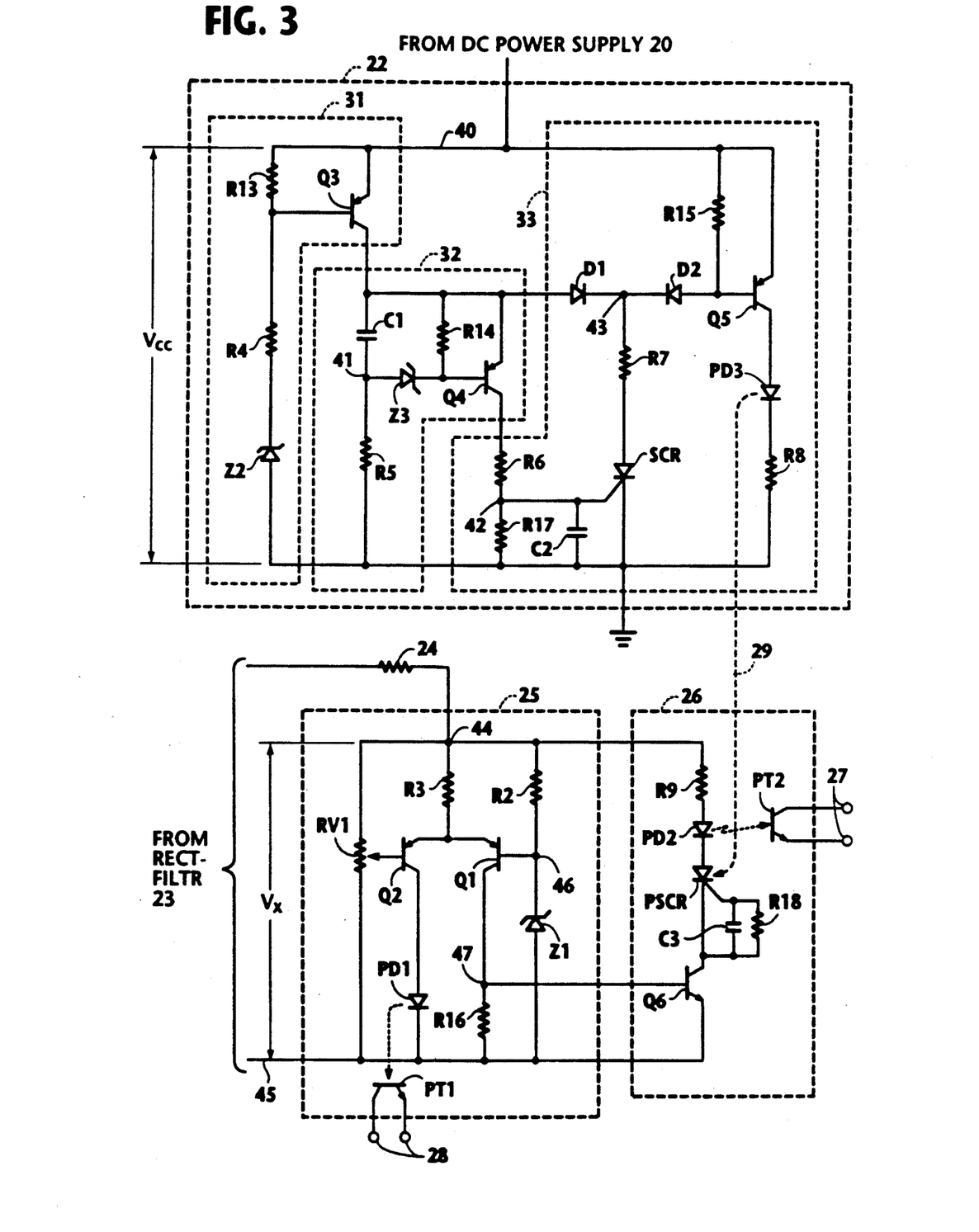
FIG. 3 is a circuit diagram of the low-voltage detectors of FIG. 2.

As shown in detail in FIG. 3, low-voltage detector 22 comprises a threshold detector 31, a delay circuit 32 and a photothyristor drive circuit 33. Threshold detector 31 comprises a series circuit formed by resistors R13, R4 and a Zener diode Z2 connected across a power line 40 and ground. A PNP transistor Q3 has a base coupled to a junction between resistors R13 and R4 and an emitter-collector path coupled from line 40 to a time-constant circuit formed by a capacitor C1 and a resistor R5 of delay circuit 32, forming a junction 41 therebetween. Transistor Q3 is in an off-state when the voltage at its base is below the breakdown voltage $V_{z2}$ of Zener diode Z2. Thus, transistor Q3 is turned on when DC voltage Vcc exceeds a threshold which is equal to the breakdown voltage $V_{z2}$ and the base-emitter voltage $V_{BE3}$ of transistor Q3. Note that resistor R13 is a bleeder resistor which functions to bypass a leakage current from Zener diode Z2 to prevent transistor Q3 from falsely being turned on.

Delay circuit 32 further includes a Zener diode Z3, which is connected between junction 41 and the base of a PNP transistor Q4, whose emitter-collector path is, in turn, connected from the collector of transistor Q3 to a series circuit formed by resistors R6 and R17 of photothyristor drive circuit 33. A resistor R14 is connected across the base and emitter of transistor Q4 to bypass a leakage current from Zener diode Z3 to prevent transistor Q4 from being turned on falsely. When voltage $V_{c1}$ across C1 exceeds a threshold equal to the sum of the breakdown voltage $V_{Z3}$ of Zener diode Z3 and the emitter-base voltage $V_{BE4}$ of transistor Q4, transistor Q4 is turned on. Note that Zener diode Z3 and transistor Q4 have the effect of clamping the voltage $V_{c1}$ to the prescribed level $V_{Z3}+V_{BE4}$.

In photothyristor drive circuit 33, a capacitor C2 is connected in parallel with resistor R17 to form a noise-absorbing circuit at the gate trigger circuit of a thyristor SCR to prevent it from falsely responding to high frequency noise. The cathode of thyristor SCR is connected to ground and its anode is coupled through a resistor R7 to a junction 43 to which the cathodes of diodes D1 and D2 are connected. The anode of diode D2 is connected to the base of a transistor Q5. A resistor R15 is connected across the base and emitter of transistor Q5 to bypass a leakage current from thyristor SCR to prevent transistor Q5 from being falsely turned on. The anode of diode D1 is connected to the emitter of transistor Q4 to prevent the base current of transistor Q5 from flowing into the delay circuit 32. A photodiode PD3 and a collector resistor R8 are connected in series between the collector of transistor Q5 and ground. As will be described, thyristor SCR is turned on in response to the turn-on of transistor Q4, and transistor Q5 turns on in response to turn-off of transistor Q3 and remains briefly in this on-state until thyristor SCR subsequently turns off when voltage $V_{c1}$ drops to a low level in the event of a failure of DC supply 20 such as overvoltage or overcurrent.

Low-voltage detector 25 comprises a pair of PNP transistors Q1 and Q2 whose emitters are coupled together by a resistor R3 in a differential configuration to a junction 44 to which the positive output terminal of rectifier-filter 23 is connected through resistor 24. Transistor Q2 has a base coupled to the tap point of a variable resistor RV1 connected across junction 44 and a power line 45 which is coupled to the negative output terminal of rectifier-filter 23. The collector of transistor Q2 is connected to line 45 through a photodiode PD1 which is optically coupled to a phototransistor PT1 to generate a first AC transitory signal across the terminals 28 in response to a rise in voltage Vx and a second AC transitory signal in response to a drop in voltage Vx.

The base of transistor Q1 is connected to a junction 46 between a resistor R2 and a Zener diode Z1 which are connected between junction 44 and line 45, and the collector of transistor Q1 is connected to line 45 through a bleeder resistor R16 which bypass a leakage current from transistor Q1 therethrough so that transistor Q6 is prevented from falsely being turned on.

Latch 26 includes a transistor Q6 whose base is coupled to a junction 47 between the collector of transistor Q1 and resistor R16. The collector of transistor Q6 is connected to junction 44 by a series circuit including a photothyristor PSCR, a photodiode PD2 and a resistor R9. Between the gate and cathode of photothyristor PSCR is connected a high-frequency noise absorbing circuit formed by a capacitor C3 and a resistor R18 to prevent photothyristor PSCR from being falsely turned on in response to noise. Photothyristor PSCR is optically coupled to photodiode PD3 through optical path 29 to turn it on in response to light therefrom and remains in the turn-on state. The turn-on of photothyristor PSCR causes photodiode PD2 to emit light to phototransistor PT2 to generate a DC-low signal across alarm terminals 27 only if transistor Q6 is conductive.

Figure 4A:
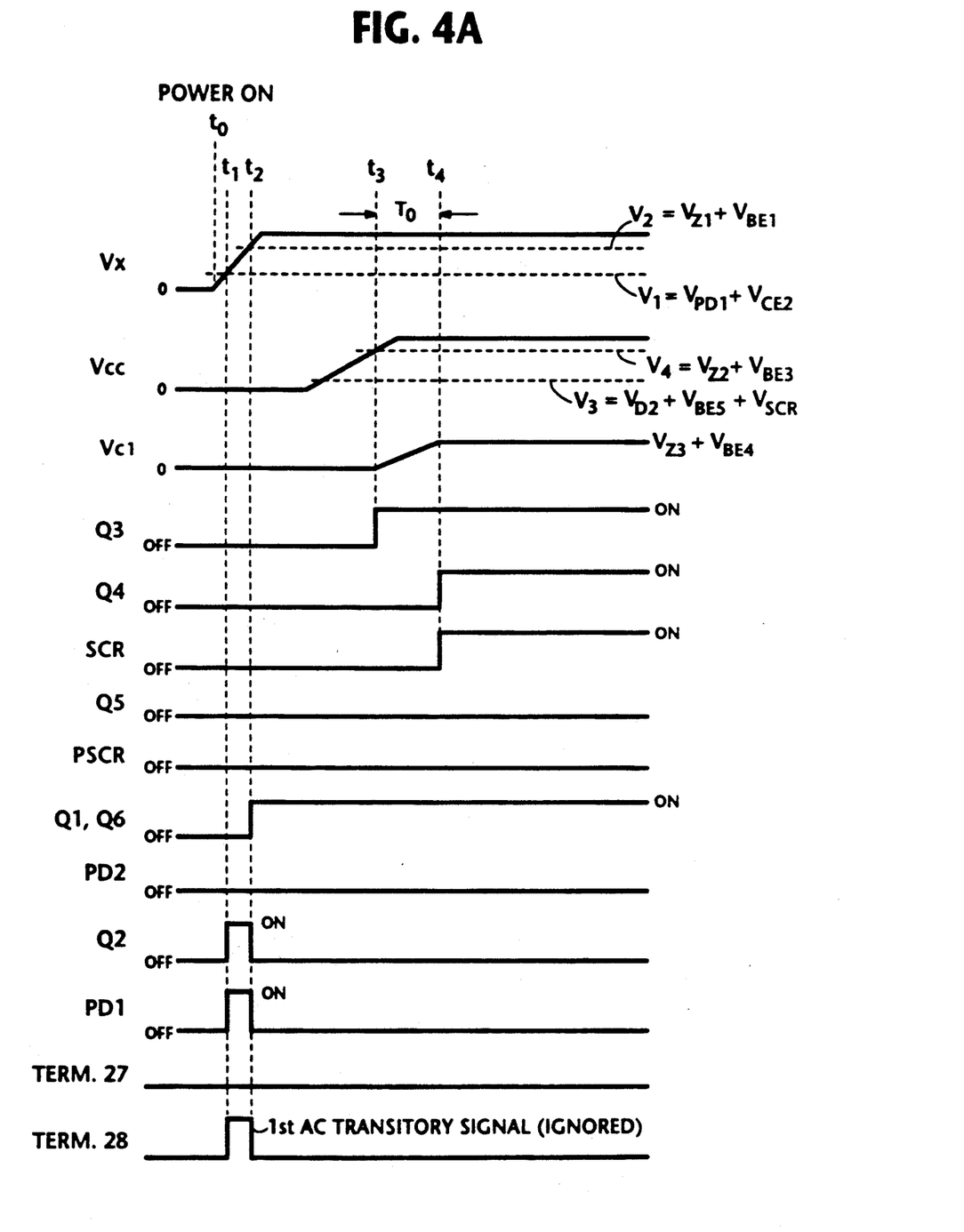
FIGS. 4A to 4C are timing diagrams for describing the operation of the circuit of FIG. 3.

The operation of the power-line monitor circuit of the present invention will now be described below with reference to FIGS. 4A, 4B and 4C. Referring to FIG. 4A, when AC power line is switched on at time $t_0$, rectifier-filter 23 starts charging its filter circuit, developing a DC output voltage which is dropped by resistor 24 and applied to low-voltage detector 25 as a voltage Vx which builds up as shown in FIG. 4A. At time $t_1$, voltage Vx reaches a lower threshold $V_1(=V_{PD1}+V_{CE2})$ which is equal to the sum of the forward-biasing voltage $V_{PD1}$ of photodiode PD1 and the collector-emitter voltage $V_{CE2}$ of transistor Q2, and transistor Q2 is turned on, and at time $t_2$, voltage Vx reaches a higher threshold $V_2$ ($V_{Z1}+V_{BE1}$) which is equal to the sum of the Zener voltage $V_{Z1}$ of diode Z1 and the base-emitter voltage $V_{BE1}$ of transistor Q1, transistors Q1 and Q6 are turned on and transistor Q2 is turned off. Therefore, photodiode PD1 is in an ON-state during the period $t_1$ and $t_2$, generating a first AC transitory signal across terminals 28 in response to the rise in voltage Vx above threshold $V_1$. However, this signal is ignored by power controller 21 as the latter is designed to start operating in response to the trailing edge of a power-on reset signal at the instant 50 milliseconds after voltage Vcc reaches a threshold $V_4(=V_{Z2}+V_{BE3})$, i.e., the sum of voltage across Zener diode Z2 and base-emitter voltage $V_{BE3}$ of transistor Q3. Therefore, inhibit signal is not required for disabling the first AC transitory signal.

Although the transistor Q6 of latch 26 is turned on at time $t_2$, photothyristor PSCR remains nonconducting, and hence no alarm signal is generated across terminals 27.

Following $t_2$, voltage Vcc begins to rise, and at time $t_3$, it reaches the threshold $V_4=V_{Z2}+V_{BE3}$, and transistor Q3 is turned on, starting to charge the time constant circuit C1/R5. At time $t_4$, voltage $V_{C1}$ across capacitor C1 is clamped to a level equal to $V_{Z3}+V_{BE4}$ which is the sum of voltage across Zener diode Z3 and the base-emitter voltage of transistor Q4. The base current of transistor Q4 begins to flow through Zener diode Z3 and resistor R5, turning this transistor on. Thus, a turn-on current flows through resistor R6 to drive thyristor SCR into conduction, causing a current to flow from line 40 to ground through transistor Q3, diode D1, resistor R7 and thyristor SCR.

If the turn-on of thyristor SCR should occur when transistor Q5 is not completely turned off, the turn-on current of the thyristor would flow through the base of transistor Q5 and diode D2 and cause transistor Q5 to switch to a full turn-on state, causing photothyristor PSCR to be turned on and generating a false DC-low signal. Since the incomplete turn-off state of transistor Q5 is likely to occur if transistor Q3 is not saturated, the introduction of delay time $T_0$ by the time constant circuit C1/R5 is to allow transistor Q3 to become completely saturated to ensure that transistor Q5 becomes completely turned off before thyristor SCR is gate-triggered.

Figure 4B:
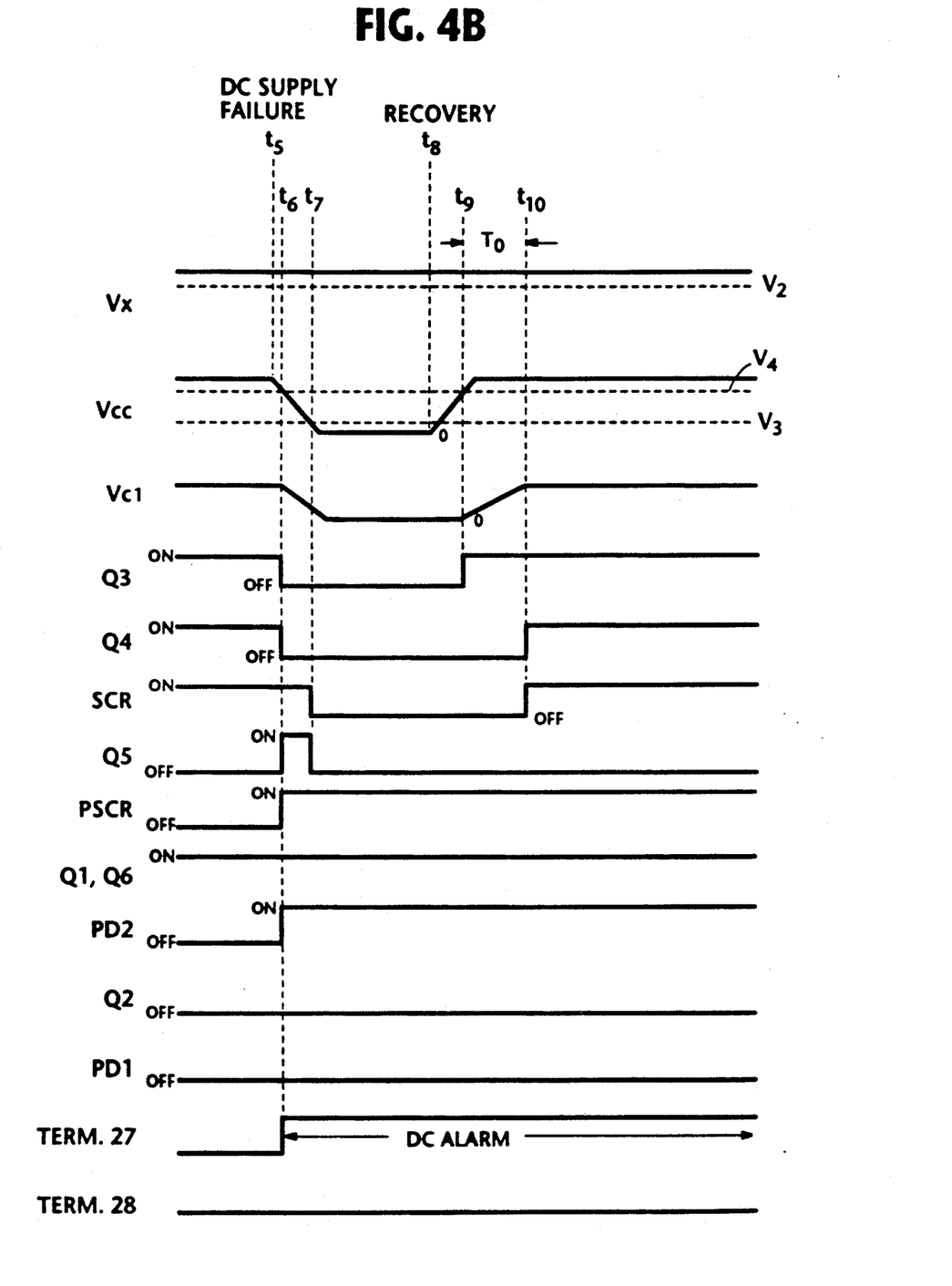

In FIG. 4B, if DC supply 20 should fail at time $t_5$, voltage Vcc will fall below threshold $V_4$ at time $t_6$, and transistors Q3 and Q4 turn off, and the turn-on current of thyristor SCR now flows through the base of transistor Q5, diode D2, resistor R7, causing transistor Q5 to turn on and causing photodiode PD3 to emit light to photothyristor PSCR, signaling the occurrence of a DC-low voltage condition. Since transistors Q1 and Q6 are conducting (indicating the absence of an AC-low alarm signal), the DC-low voltage signal is latched by photothyristor PSCR and photodiode PD2 continuously emits light to phototransistor PT2, applying a DC alarm signal across DC-alarm terminals 27. Subsequently at time $t_7$, voltage Vcc falls below threshold $V_3(=V_{D2}+V_{BE5}+V_{SCR})$, i.e., the sum of the voltage across diode D2, the base-emitter voltage of transistor Q5 and the voltage across thyristor SCR), and thyristor SCR turns off, causing transistor Q5 to turn off.

If DC supply 20 is recovered at time $t_8$, voltage Vcc will rise above threshold $V_4$ at time $t_9$, and transistor Q3 is turned on again. At time $t_{10}$ which is the end of delay period $T_0$ following $t_9$, transistor Q4 and thyristor SCR are turned on again. Regardless of these recovery sequences, the DC-low signal is maintained to indicate that a trouble has occurred in the DC supply 20.

Figure 4C:
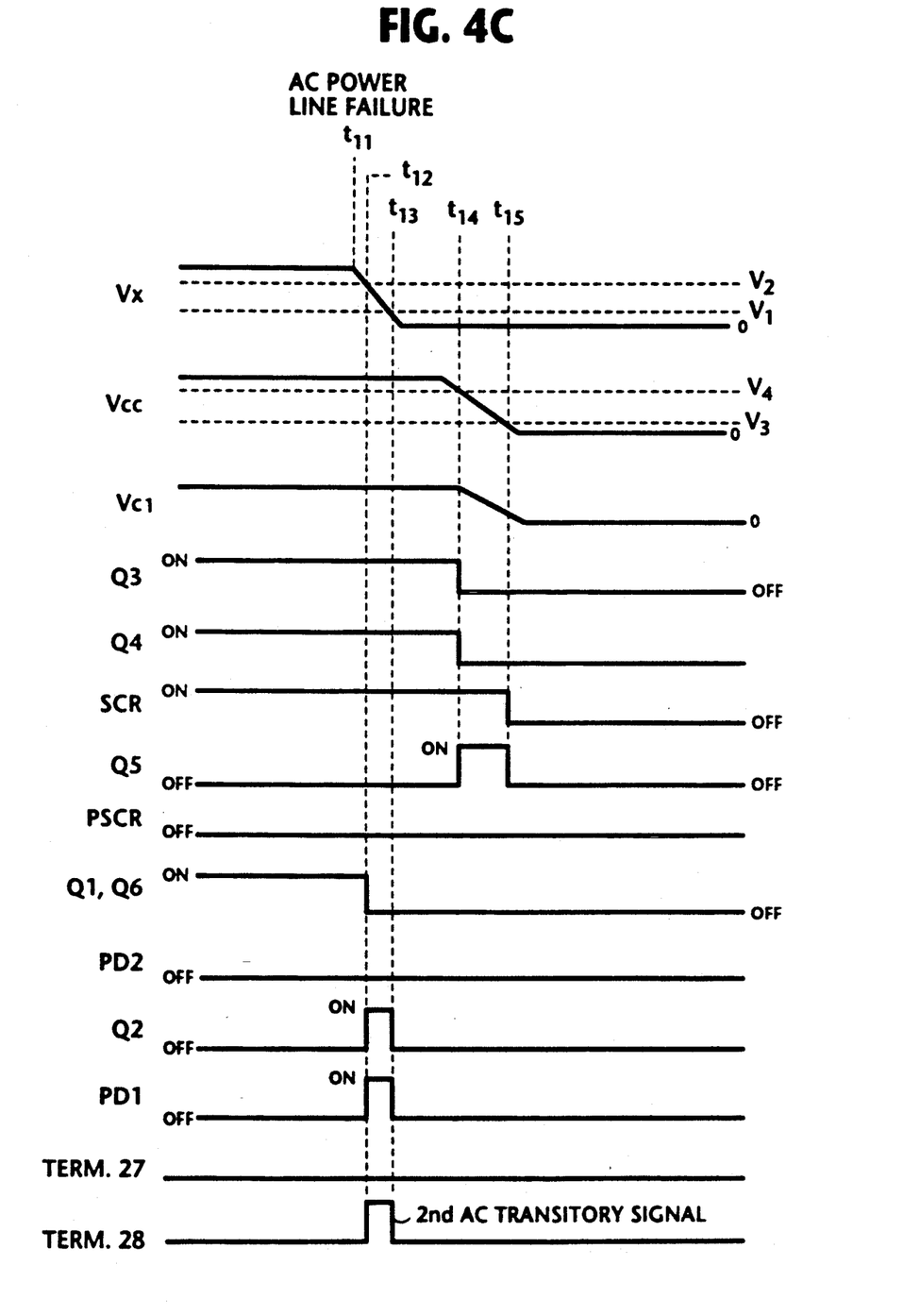

Referring to FIG. 4C, if the AC power line should fail at time $t_{11}$ during operation, voltage Vx falls below threshold $V_2$ at time $t_{12}$, causing transistors Q1 and Q6 to turn off and causing transistor Q2 and hence photodiode PD1 to turn on, emitting light to phototransistor PT1. When voltage Vx subsequently falls below threshold $V_1$ at time $t_{13}$, transistor Q2 turns off. Therefore, a second AC transitory signal appears across terminals 28 during a period from $t_{12}$ to $t_{13}$ in response to the drop in voltage Vx below threshold $V_2$. Since DC power supply 20 is designed for a power downtime of 10 milliseconds or so, power controller 21 is able to receive the AC-low signal to take appropriate emergency actions. Voltage Vcc from DC power supply 20 will eventually decrease and, at time $t_{14}$, it will become lower than threshold $V_4$, allowing transistors Q3 and Q4 to turn off. The turn-on current of thyristor SCR flows through the base of transistor Q5 to cause it to turn on, emitting light from photodiode PD3 to photothyristor PSCR. Since transistors Q1 and Q6 have already been turned off, photodiode PD2 remains in the turn-off state before voltage Vcc drops below threshold $V_3$, thus preventing a DC-low signal from being applied to controller 21.

What is claimed is:

1. A power monitor circuit comprising:
   DC power supply means for converting an AC power-line voltage to a first DC voltage for energizing a utilization circuit and shutting itself down if an overvoltage or overcurrent occurs therein;

rectifier-filter means for converting said AC power-line voltage to a second DC voltage;

DC low-voltage detector means for monitoring the level of voltage at the output of said DC power supply means and generating a DC low-voltage indicating signal in response to a significant drop in the monitored voltage level below a specified value;

AC low-voltage detector means for monitoring the level of voltage at the output of said rectifier-filter means and generating a normal-state signal when the monitored voltage level is higher than a specified value and an AC alarm signal when the monitored voltage level is lower than a specified value; and latch means energized with the second DC voltage for latching said DC low-voltage indicating signal during the presence of said normal-state signal and deriving a DC alarm signal from the latched signal.

2. A power monitor circuit as claimed in claim 1, wherein said DC low-voltage detector means includes a photodiode circuit for generating an optical pulse as said DC low-voltage indicating signal, and wherein said latch means includes a photothyristor circuit responsive to said optical pulse during said interval to derive said DC alarm signal.

3. A power monitor circuit comprising:

DC power supply means for converting an AC power-line voltage to a first, regulated DC voltage, said power supply means shutting itself down if an overvoltage or overcurrent occurs therein and having operating characteristics such that the level of voltage at the output thereof rises from zero to a regulated value in slow response to application of said power-line voltage thereto and drops to zero in slow response to a significant drop in said AC power-line voltage;

rectifier-filter means for converting said AC power-line voltage to a second, nonregulated DC voltage, said rectifier-filter means having operating characteristics such that the level of voltage at the output thereof rises from zero to an operating value in quick response to application of said power-line voltage thereto and drops to zero in quick response to said significant drop in said AC power-line voltage;

DC low-voltage detector means for monitoring the level of voltage at the output of said DC power supply means and generating a DC low-voltage indicating signal in response to a significant drop in the monitored voltage level below a specified value;

AC low-voltage detector means for monitoring the level of voltage at the output of said rectifier-filter means and generating a first AC transitory signal in response to a rise in the monitored voltage level to said operating value and a second AC transitory signal in response to a drop of the monitored voltage level to a value at or near zero voltage;

latch means energized with the second DC voltage for latching said DC low-voltage indicating signal during an interval beginning with the occurrence of said first AC transitory signal and terminating with the occurrence of said second AC transitory signal and deriving a DC alarm signal from the latched signal; and power control means energized with said regulated DC voltage for controlling a utilization circuit in response to said first and second AC transitory signals.

4. A power monitor circuit as claimed in claim 3, wherein said DC low-voltage detector means includes a photodiode circuit for generating an optical pulse as said DC low-voltage indicating signal, and wherein said latch means includes a photothyristor circuit responsive to said optical pulse during said interval to derive said DC alarm signal.

5. A power monitor circuit as claimed in claim 3, wherein said power control means is insensitive to said first AC transitory signal which is generated when said AC power-line voltage is initially applied to said power monitor circuit.

* * * * *

UNITED STATES PATENT AND TRADEMARK OFFICE
CERTIFICATE OF CORRECTION

PATENT NO. : 5,079,688
DATED : January 7, 1992
INVENTOR(S) : Toru KIDO

It is certified that error appears in the above-identified patent and that said Letters Patent is hereby corrected as shown below:

Col. 1, line 14, delete "converter" and insert --rectifier-filter--;

Col. 1, line 16, delete "converter" and insert --rectifier-filter--;

Col. 4, line 52, delete "$V_{c1}$" and insert --$V_{cc}$--.

Signed and Sealed this

Twenty-first Day of September, 1993

Attest:

BRUCE LEHMAN

Attesting Officer

Commissioner of Patents and Trademarks